United States Patent
Liu et al.

(10) Patent No.: US 7,154,960 B2
(45) Date of Patent: Dec. 26, 2006

(54) METHOD OF DETERMINING THE CAPACITY OF EACH TRANSMITTER ANTENNA IN A MULTIPLE INPUT/MULTIPLE OUTPUT (MIMO) WIRELESS SYSTEM

(75) Inventors: Jung-Tao Liu, Randolph, NJ (US); Ashok N. Rudrapatna, Basking Ridge, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 766 days.

(21) Appl. No.: 10/334,314

(22) Filed: Dec. 31, 2002

(65) Prior Publication Data

US 2004/0125900 A1 Jul. 1, 2004

(51) Int. Cl.
H04B 7/02 (2006.01)
H04B 17/02 (2006.01)
H04L 1/02 (2006.01)
H04L 7/00 (2006.01)
H04L 27/20 (2006.01)

(52) U.S. Cl. .............. 375/267; 375/347; 375/358; 375/299; 455/101; 455/137

(58) Field of Classification Search ........ 375/130, 375/140, 141, 146, 147, 358, 354, 295, 316, 375/259, 260, 267, 347; 455/91, 101, 103, 455/272, 269, 130; 370/277, 278, 282, 464
See application file for complete search history.

(56) References Cited

U.S. PATENT DOCUMENTS

| | | | |
|---|---|---|---|
| 5,712,877 A * | 1/1998 | Ho et al. ................. 375/284 |
| 6,473,467 B1 | 10/2002 | Wallace et al. ........... 375/267 |
| 6,771,706 B1 * | 8/2004 | Ling et al. ............... 375/267 |
| 7,050,510 B1 * | 5/2006 | Foschini et al. ......... 375/299 |
| 2002/0003833 A1 * | 1/2002 | Usuda et al. ............ 375/144 |
| 2002/0154705 A1 * | 10/2002 | Walton et al. ........... 375/267 |
| 2003/0063654 A1 * | 4/2003 | Onggosanusi et al. .... 375/130 |
| 2003/0153322 A1 * | 8/2003 | Burke et al. ............. 455/450 |
| 2004/0082356 A1 * | 4/2004 | Walton et al. ........... 455/522 |

OTHER PUBLICATIONS

Su et al., "Space-Time Turbo Codes with Full Diversity Antenna", Jan. 2001, IEEE Transactions on Communications, vol. 49, No. 1, pp. 47-57.*

* cited by examiner

Primary Examiner—Tesfaldet Bocure
Assistant Examiner—Vineeta Panwalkar
(74) Attorney, Agent, or Firm—Stephen M. Gurey

(57) ABSTRACT

The per antenna capacity of each of the transmitter antennas in a MIMO system are individually determined from measurable information at the receiver end. Specifically, the channel capacity for each individual transmitter antenna is calculated at the receiver end as a function of measurable channel coefficients (also known as channel state information), the measurable average signal-to-noise ratio, and the number of transmitter antennas. Once the per antenna capacity of each transmitter antenna is individually determined at the receiver end, the maximum transmission rate for each data stream transmitted by each transmitter antenna is determined from that individual capacity either at the receiver end and fed back to the transmitter end, or is determined at the transmitter end from the individual transmitter antenna capacities that are fed back by the receiver end to the transmitter end. A modulation scheme that supports each maximum transmission rate is then determined based on some defined criteria.

14 Claims, 3 Drawing Sheets

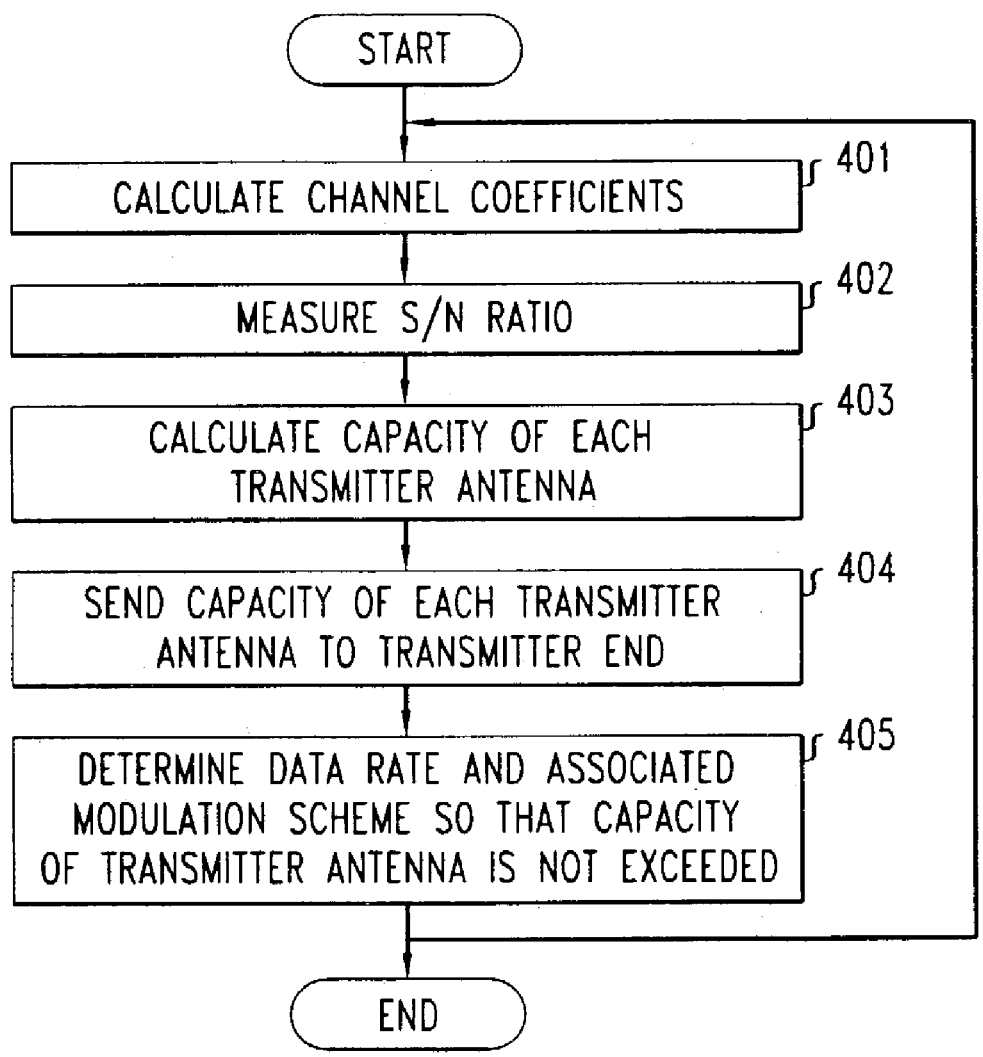

METHOD OF DETERMINING THE CAPACITY OF EACH TRANSMITTER ANTENNA IN A MULTIPLE INPUT/MULTIPLE OUTPUT (MIMO) WIRELESS SYSTEM

TECHNICAL FIELD

The invention relates to wireless communication, and more particularly, to Multiple Input/Multiple Output (MIMO) wireless systems.

BACKGROUND OF THE INVENTION

The demand for wireless communication for high-speed data communication in addition to voice communication is growing at a fast rate. As this demand continues to grow, systems that are capable of providing both high efficiency and high performance will be increasingly desirable. Multiple Input/Multiple Output (MIMO) systems employ multiple transmitter antennas that transmit to multiple receiver antennas over a wireless channel. Since multiple independent data streams are simultaneously transmitted using the same frequency band, MIMO systems are spectrally highly efficient and, as a result, a higher data throughput is achievable as compared to a single antenna system.

As in all wireless system, the propagation channel is subject to various time-variant channel conditions, or qualities, that cause the amplitude and phase of the received signal to vary. The capacity of the channel is determined, in part, by these channel qualities determined at the receiver end of a wireless system and this channel capacity, when provided to the transmitter, can be used for determining the maximum rate at which the transmitter can transmit a signal to the receiver via that channel. In a MIMO system, each of the multiple transmitter antennas transmits a data stream to the multiple receiver antennas over what can be considered a separate channel. The resultant received signal vector at each receiver antenna is, therefore, a combination of the data streams transmitted by all of the transmitter antennas. Determining the channel qualities of each data stream is thus very difficult. In the prior art, therefore, where channel capacity has been used as the metric for determining a maximum transmission rate at which to transmit the multiple data streams, the capacity of the channel as a whole between the transmitter and the receiver antennas has been determined using overall channel qualities. This overall capacity has then been used to determine a single maximum transmission rate for transmitting each of the data streams. Disadvantageously, this single maximum transmission rate may not optimize usage of the individual channels on which the multiple transmitter antennas are transmitting.

SUMMARY OF THE INVENTION

In accordance with the present invention, the per antenna capacity of each of the transmitter antennas in a MIMO system are individually determined from measurable information at the receiver end. Specifically, it has been determined that the channel capacity for each individual transmitter antenna can be calculated at the receiver end as a function of measurable channel coefficients (also known as channel state information), the measurable average signal-to-noise ratio, and the number of transmitter antennas. Once the per antenna capacity of each transmitter antenna is individually determined at the receiver end, the maximum transmission rate for each data stream transmitted by each transmitter antenna can be determined from that individual capacity either at the receiver end and fed back to the transmitter end, or determined at the transmitter end from the individual transmitter antenna capacities which are fed back by the receiver end to the transmitter end. A modulation and coding scheme that supports each maximum transmission rate is then determined based on some defined criteria.

As noted, the per antenna capacity for each channel has been determined to be a predefined function of selected channel coefficients, h, also known as the channel state information, in the instantaneous channel response matrix, H. The matrix H represents the response of the channel to a transmitted signal as the signal is affected by the amplitude and phase variations caused by the channel. The coefficients in the matrix H represent the operands upon an input signal, which transform a transmitted signal into a received signal due to the amplitude and phase variations imposed upon the transmitted signal by the channel conditions. The coefficients in the channel response matrix are determinable at the receiver end. In addition to the channel coefficients, h, the capacity of each transmitter antenna is also function of the number of transmitter antennas, t, and the average signal to noise (S/N) ratio, $\rho$, the latter measured at the receiver. Since channel conditions are constantly changing over a wireless channel, the capacity of each transmitter antenna is constantly updated, such as periodically once every n-th frame, where n can be 1 or greater, or aperiodically. The maximum transmission rate of each data stream transmitted by each transmitter antenna is then constantly updated and optimized based the most current channel condition information.

BRIEF DESCRIPTION OF THE DRAWING

FIG. 4 is a flowchart that summarizes the method of the present invention.

DETAILED DESCRIPTION

Figure 1:
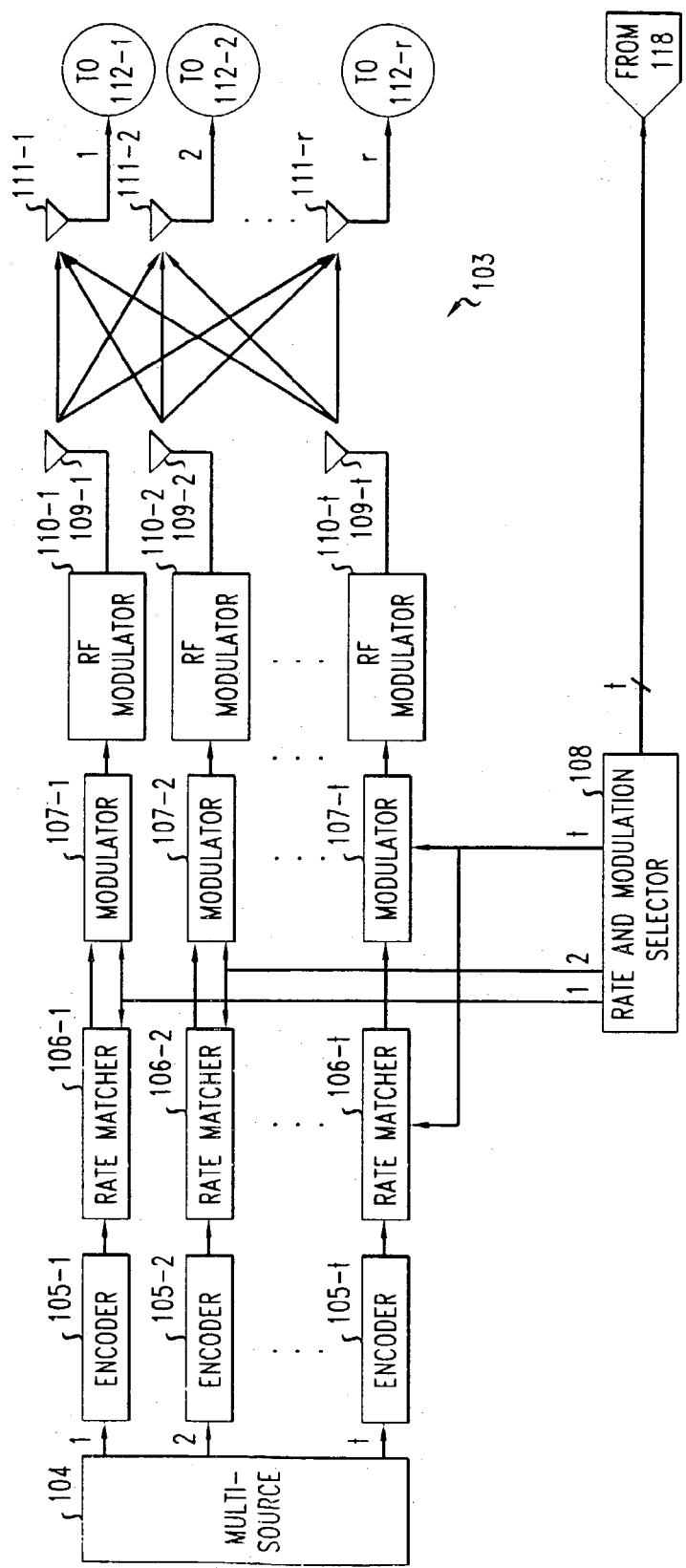
FIGS. 1 and 2 when placed side-by-side as shown in FIG. 3 show the architecture of a MIMO wireless system in accordance with the present invention.
Figure 2:
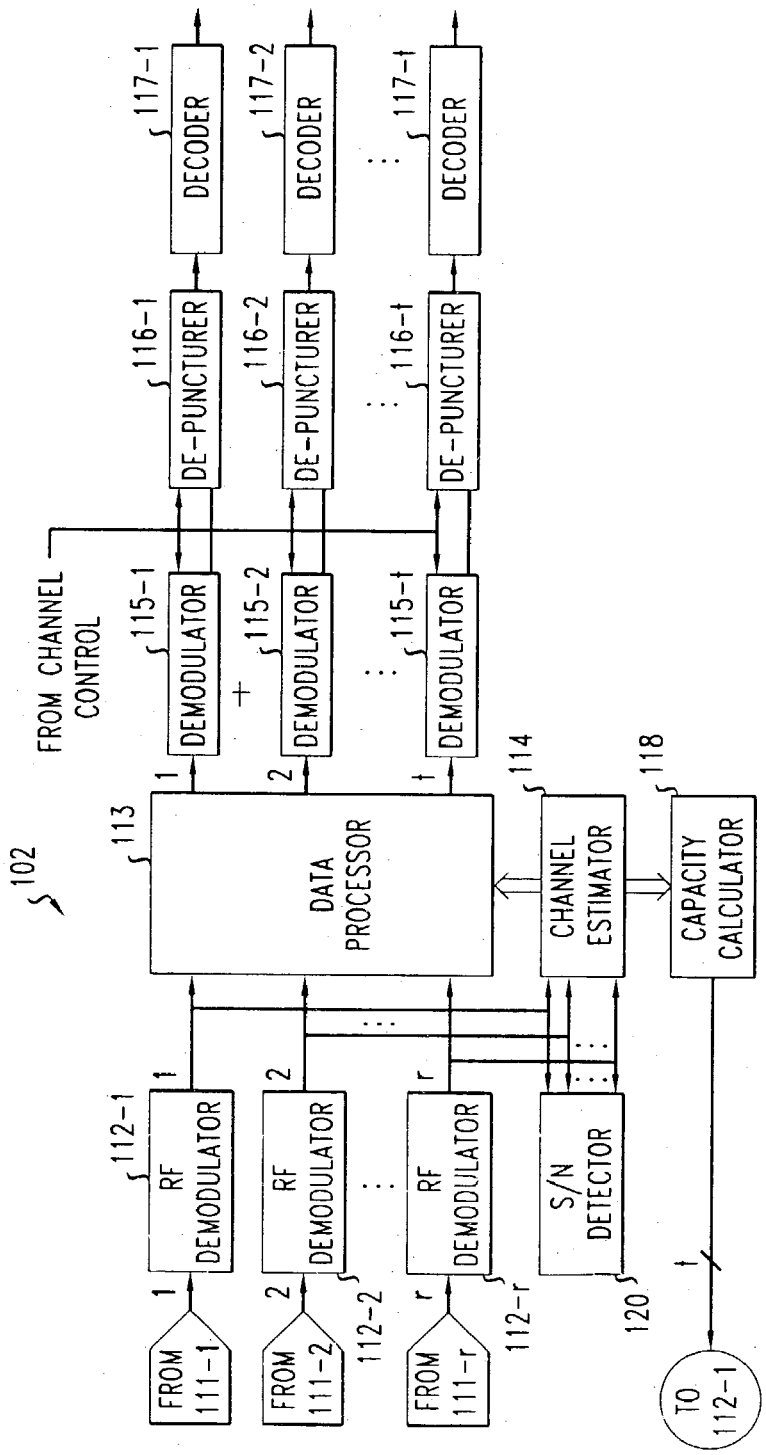
Figure 3:
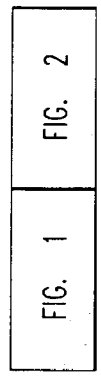

With reference to FIGS. 1 and 2, a multiple input/multiple output wireless communications system is shown that includes a transmitter end 101 that is communicating with a receiver end 102 over a wireless communication channel 103 via a plurality, t, of simultaneously transmitted data streams. Each of the t data streams transmitted between the transmitter end 102 and the receiver end 103 can be derived from data signals, voice signals, video signals, or any combination of these or other types of digital signals. The communication system can be any type of wireless system employing, for example, well-known time division multiple access (TDMA) techniques, code division multiple access (CDMA) techniques, or any other type of multiple access technique.

The t data streams that are transmitted over separate channel paths within the communication channel 103 are subject to various impairments that can induce amplitude and phase variations into the received data streams. These impairments are time variant and are the result of several factors including atmospheric conditions and relative movement between the transmitter end 101 and the receiver end 102. Further, the separate channel paths over which the data streams are transmitted can be assumed to be independent of each other.

For illustrative purposes, a multi-signal source 104 is shown outputting a plurality, t, of signals. The i-th of these t signals, for 1≦i≦t, is separately encoded by an encoder 105-i connected to the i-th output of source 104. As will be described in detail below, a rate matcher 106-i and modulator 107-i match the transmission rate and modulation and coding scheme, respectively, of this i-th data stream in response to a data rate and modulation and coding scheme selected by rate and modulation selector 108. Rate and modulation selector 108 is responsive to the determined capacity of the particular transmitter antenna 109-i on which this i-th signal is transmitted, which capacity is determined at the receiver end 102, as will be described below. Rate matcher 106-i uses either puncturing or repetition to achieve the data rate selected by rate and modulation selector 109, while modulator 107-i uses a modulation and coding scheme, which when used in combination with the selected data rate, keeps the transmitter antenna 109-i below its determined capacity. For example, if the capacity of a transmitter antenna is determined to a dimensionless 2, a rate of 0.5 for the data stream with a modulation and coding scheme that provides 4 bits/symbol yields a capacity of 2. A rate is thus chosen for channel i so that the determined capacity of the transmitter antenna 109-i is not exceeded.

The combined rate and modulation and coding scheme selected by rate and modulation selector 108 for each transmitter antenna 109-i are transmitted over a control channel (not shown) to the receiver end 102, so that, as will be described, the receiver can properly reconstruct each of the t transmitted data streams from the received data streams.

The output of modulator 107-i is up-converted to a radio frequency (RF) by an associated RF modulator 110-i. In turn, the resultant RF-frequency signal is transmitted by antenna 109-i in the array of t transmitter antennas. In a MIMO system, there are r receiver antennas 111-1–111-r at the receiver end 102 that correspond to the t transmitter antennas 108-1–108-t at the transmit end 101. The number of receiver antennas, r, may or may not equal the number of transmitter antennas, t. The RF-frequency signal transmitted by each transmitter antenna 109 is received by each of the r receiver antennas 111 after transiting a channel path within the impairment-inducing channel 103. The received signal vector at any receiver antenna 111-i is therefore a combination of the signals transmitted by each of the transmitter antennas 109-1–109-t, wherein each signal in the combination of signals received at a receiver antenna 111-i is individually affected by the channel conditions encountered over the separate paths in channel 103.

The t combined RF-frequency signals received by each of the r receiver antennas 111-1–111-r are down-converted to baseband signals by demodulators 112-1–112-r, respectively. A data processor 113 processes the resultant r baseband signals and converts them back into t data streams, corresponding to the t data streams at the outputs of modulators 107-1–107-t. Data processor 113 uses an r-by-t instantaneous channel response matrix H, the coefficients of which are determined by channel estimator 114 from the r baseband signals, to transform the r base-band signals into t output data streams. The channel coefficients in the H matrix are such that the coefficient $h_{ij}$ at column i and row j operates on the signal received at receiver antenna 111-j received from transmitter antenna 109-i to compensate for the effects of the channel. The total signal received by receiver antenna 111-j is thus equal to sum of the signals transmitted by each transmitter antenna 109-i times $h_{ij}$ for i=1 to t. The channel coefficients in the instantaneous channel response matrix H, representing the instantaneous condition of the channel can be determined using various methodologies well-known to those skilled in the art, such as, for example, by using pilot signals as described in U.S. Pat. No. 6,473,467 to Wallace et al. issued on Oct. 29, 2002.

In a noiseless and perfectly predictable channel, the t output signals of data processor 113 would replicate the corresponding t output signals of modulators 107-1–107-t at the transmitter end 101. Thermal noise introduced by the receiver and channel uncertainty resulting from the calculated channel coefficients in the matrix H, however, cause the received signal to differ from its corresponding transmitted signal. Each of the t output signals of data processor 113 are demodulated by a demodulator 115-1–115-t, and de-punctured by a de-puncturer 116-1–116-t, in an inverse manner corresponding to the puncturing/repetition performed by rate matchers 106-1–106-t, and the modulation and coding performed by modulators 107-1–107-t. As aforenoted, the information regarding the rate matchers 106 and modulators 107 at the transmitting end 101 is provided to the de-puncturers 116 and demodulators 115 via a control channel. Each of the resultant t demodulated and de-punctured data streams is inputted to one of the decoders 117-1–117-t, respectively, to reconstruct the t data streams corresponding to the outputs of multi-source 104.

As previously noted, in accordance with the present invention, the capacity of each of the transmitter antennas 109 is individually determined at the receiver end 102 in order to optimize usage of each transmit channel. Once the capacity of each of the transmitter antennas is determined, a data rate and modulation scheme used for transmitting the data stream over each channel can be optimized to that capacity.

In order to determine the capacity of each transmitter antenna, the inventors have analyzed the instantaneous capacity of the overall channel. Specifically, for a t-transmit, r-receive antenna MIMO system, the instantaneous capacity of the overall channel assuming Gaussian noise can be shown to be given by:

$$\text{Capacity} = \log_2 \det\left(I + \frac{\rho}{t} HH^+\right) \quad (1)$$

where "+" is the Hermitian transpose of a complex-valued matrix; "det" represents the determinant of a matrix; I is an r-by-r identity matrix; ρ is the average signal to noise ratio; and H is the r-by-t instantaneous channel response matrix. The H matrix can be further partitioned into the following form:

$$H = [\underline{h}_1 \underline{h}_2 \ldots \underline{h}_t] \quad (2)$$

where $\underline{h}_i$ is the i-th column the channel matrix H.

In order to determine the channel capacity for each transmitter antenna, the overall capacity is decomposed as follows:

$$\text{Overall Capacity} = \log_2 \det\left(I + \frac{\rho}{t} HH^+\right) \quad (3)$$

$$= \log_2 \det\left(I + \frac{\rho}{t}[\underline{h}_1 \ \underline{h}_2 \ \cdots \ \underline{h}_t]\begin{bmatrix} \underline{h}_1^+ \\ \underline{h}_2^+ \\ \vdots \\ \underline{h}_t^+ \end{bmatrix}\right)$$

$$= \log_2 \det\left(I + \frac{\rho}{t}\sum_{i=1}^{t} \underline{h}_i \underline{h}_i^+\right)$$

-continued $$= \log_2 \det\left(I + \frac{\rho}{t}\sum_{i=2}^{t} h_i h_i^+ + \frac{\rho}{t} h_1 h_1^+\right)$$

$$= \log_2\left(I + \frac{\rho}{t} h_1^+\left(I + \frac{\rho}{t}\sum_{i=2}^{t} h_i h_i^+\right)^{-1} h_1\right)$$

$$\det\left(I + \frac{\rho}{t}\sum_{i=2}^{t} h_i h_i^+\right)$$

$$= \log_2\left(I + \frac{\rho}{t} h_1^+\left(I + \frac{\rho}{t}\sum_{i=2}^{t} h_i h_i^+\right)^{-1} h_1\right) +$$

$$\log_2 \det\left(I + \frac{\rho}{t}\sum_{i=2}^{t} h_i h_i^+\right)$$

In order to arrive at the last equation, the following mathematic relationship is used:

$$\det(A+\underline{x}\underline{y}^+) = (1+\underline{y}^+ A^{-1}\underline{x})\det(A) \quad (4)$$

What can be observed is that the $1^{st}$ term in equation (3) is the capacity of the $1^{st}$ antenna while all other data streams are treated as interferences to the $1^{st}$ data stream; and the second term represents the overall capacity of a same system without the $1^{st}$ antenna. The $2^{nd}$ term in the last equation can be expanded into t−1 terms, each corresponding to the capacity for a given transmitter antenna in the system. The final equation is given as:

$$\text{Overall Capacity} = \log_2\left(I + \frac{\rho}{t} h_1^+\left(I + \frac{\rho}{t}\sum_{i=2}^{t} h_i h_i^+\right)^{-1} h_1\right) + \quad (5)$$

$$\log_2\left(I + \frac{\rho}{t} h_2^+\left(I + \frac{\rho}{t}\sum_{i=3}^{t} h_i h_i^+\right)^{-1} h_2\right) +$$

$$\log_2\left(I + \frac{\rho}{t} h_3^+\left(I + \frac{\rho}{t}\sum_{i=4}^{t} h_i h_i^+\right)^{-1} h_3\right) + \cdots +$$

$$\log_2\left(1 + \frac{\rho}{t} h_t^+ h_t\right)$$

It can be noted that at the last term in equation (5), all the interferences from other antennas are cancelled out. Therefore, the capacity is simply the Shannon capacity for a single antenna AWGN (Additive White Gaussaian Noise) channel. The capacity of each transmitter antenna 109-i, for $1 \leq i \leq t$, can therefore be calculated using the i-th term in equation (5) above.

Accordingly, capacity calculator 118 separately calculates the capacity of each of the t transmitter antennas 109 from the measured channel coefficients in the H matrix determined by channel estimator 114, the known number of transmitter antennas, t, and the measured signal-to-noise ratio, $\rho$. S/N detector 120, connected to the outputs of RF demodulators 112-1–112-r, determines the latter. The t calculated antenna transmitter capacities are then fed back to the transmitter end 101, unlike the prior art in which only one value, the overall capacity, is fed back to the transmitter end.

At the transmitter end 101, the rate and modulation selector 108 uses the t fed back transmitter capacities to determine for each transmitter antenna 109, an optimum data rate and modulation and coding scheme to maintain the usage of each transmitter antenna below its determined capacity. As previously described, this information is provided to each rate matcher 106 and modulator 107, and provided forward back to the receiver end via a control channel.

Although shown in the FIG. 1 as being located at the transmitter end 101, the rate and modulation selector 108 could alternatively be at the receiver end 102 either incorporated as part of the capacity calculator 118, or as a separate element.

The capacity of each transmitter antenna 109 should preferable be calculated frequently in order to react to changing channel conditions that affect the capacity of each channel. Accordingly, the channel capacities can be recalculated upon each recalculation by channel estimator 114 of the channel coefficients in the H matrix, such as once each frame, or once every n-th frame. Alternatively, the capacities can be recalculated aperiodically.

The flowchart in FIG. 4 summarizes the steps of the method of the present invention. At step 401, the channel coefficients of the transmission channel are determined. At step 402, $\rho$, the signal-to-noise ratio, is measured. At step 403, using the determined channel coefficients, the measured signal-to-noise ratio, and the number of transmitter antennas, t, the capacity of each individual transmitter antenna is determined using each term, respectively, of equation (5). At step 404, the transmitter antenna capacities are fed back to the transmitter end. At step 405, the data rate and associated modulation scheme for each transmitter antenna are determined so that the calculated capacity of each transmitter antenna is not exceeded. Optionally, as previously discussed, the data rates and associated modulation and coding scheme may be determined at the receiver end from the determined transmitter capacities, and then fed back to the transmitter end. Steps 401–405 are repeated throughout transmission between the transmitter and receiver ends in order to track channel capacities of each transmitter antenna with changing channel conditions that affect the channel coefficients and signal-to-noise ratio determined by the receiver end.

In the embodiment described above, the transmitter end can be a base station and the receiver end a wireless unit or, alternatively, the transmitter end can be a wireless unit and the receiver end a base unit.

The above-described embodiment is illustrative of the principles of the present invention. Those skilled in the art could devise other embodiments without departing from the spirit and scope of the present invention.

The invention claimed is:

1. In a multiple input/multiple output wireless system in which a plurality of transmitter antennas at a transmitter end of the system transmit a plurality of signals on separate channels to a plurality of receiver antennas at a receiver end of the system, a method comprising:

determining, at the receiver end, instantaneous channel coefficients of each of the separate channels between the plurality of transmitter antennas and the plurality of receiver antennas;

determining an average signal-to-noise ratio of the signals received by the receiver antennas;

calculating, using the determined instantaneous channel coefficients and the determined average signal-to-noise ratio, the individual capacities of the transmitter antennas wherein the capacity of the k-th transmitter antenna, for k between 1 and t, is determined from the k-th term in $$\log_2\left(I + \frac{\rho}{t}h_1^+\left(I + \frac{\rho}{t}\sum_{i=2}^{t}h_ih_i^+\right)^{-1}h_1\right)+$$

$$\log_2\left(I + \frac{\rho}{t}h_2^+\left(I + \frac{\rho}{t}\sum_{i=3}^{t}h_ih_i^+\right)^{-1}h_2\right)+$$

$$\log_2\left(I + \frac{\rho}{t}h_3^+\left(I + \frac{\rho}{t}\sum_{i=4}^{t}h_ih_i^+\right)^{-1}h_3\right)+\cdots+\log_2\left(1 + \frac{\rho}{t}h_t^+h_t\right)$$

where t is the number of transmitter antennas, ρ is the average signal-to-noise ratio of the received signals, I is an identity matrix, $h_j$ is an i-th column for any i between 1 and t of a channel matrix containing the determined channel coefficients in which each coefficient $h_{ij}$ is the determined channel coefficient between the i-th transmitter antenna and the j-th receiver antenna, and $h_i^+$ is the Hermitian transpose of $h_i$; and
using the calculated individual capacities of the transmitter antennas, transmitting information back to the transmitter end so that when each transmitter antenna uses a determined data rate and modulation and coding scheme for each transmitter antenna, the calculated individual capacity of each transmitter antenna is not exceeded.

2. The method of claim 1 wherein the information transmitted back to the transmitter end comprises the calculated individual capacities of the transmitter antennas, whereby the transmitter end determines the data rate and modulation and coding scheme for each transmitter antenna so that the calculated individual capacity of each transmitter antenna is not exceeded.

3. The method of claim 1 wherein the receiver end:
determines the data rate and modulation and coding scheme for each transmitter antenna so that the calculated capacity of each individual transmitter antenna is not exceeded, and
the information transmitted back to the transmitter end comprises the determined data rate and modulation and coding scheme for each transmitter antenna.

4. The method of claim 1 wherein the transmitter end is a base station and the receiver end is a wireless unit.

5. The method of claim 1 wherein the transmitter end is a wireless unit and the receiver end is a base station.

6. The method of claim 1 wherein the capacities of the transmitter antennas are calculated every n-th frame, where n is 1 or more.

7. In a multiple input/multiple output wireless system in which a plurality of transmitter antennas at a transmitter end of the system transmit a plurality of signals on separate channels to a plurality of receiver antennas at a receiver end, a method comprising:
determining, at the receiver end, the individual capacity of each of the transmitter antennas from instantaneous channel coefficients of the separate channels and a measured average signal-to-noise ratio of the transmitted signals received at the receiver end wherein the capacity of the k-th transmitter antenna, for k between 1 and t, is determined from the k-th term in $$\log_2\left(I + \frac{\rho}{t}h_1^+\left(I + \frac{\rho}{t}\sum_{i=2}^{t}h_ih_i^+\right)^{-1}h_1\right)+$$

$$\log_2\left(I + \frac{\rho}{t}h_2^+\left(I + \frac{\rho}{t}\sum_{i=3}^{t}h_ih_i^+\right)^{-1}h_2\right)+$$

$$\log_2\left(I + \frac{\rho}{t}h_3^+\left(I + \frac{\rho}{t}\sum_{i=4}^{t}h_ih_i^+\right)^{-1}h_3\right)+\cdots+\log_2\left(1 + \frac{\rho}{t}h_t^+h_t\right)$$

where t is the number of transmitter antennas, ρ is the average signal-to-noise ratio of the received signals, I is an identity matrix, $h_j$ is an i-th column for any i between 1 and t of a channel matrix containing the determined channel coefficients in which each coefficient $h_{ij}$ is the determined channel coefficient between the i-th transmitter antenna and the j-th receiver antenna, and $h_i^+$ is the Hermitian transpose of $h_i$; and
using the determined individual capacity of each of the transmitter antennas, transmitting information back to the transmitter end so that when each transmitter antenna uses a determined data rate and modulation and coding scheme for each transmitter antenna, the calculated individual capacity of each transmitter antenna is not exceeded.

8. The method of claim 7 wherein the information transmitted back to the transmitter end comprises the calculated individual capacity of each of the transmitter antennas, whereby the transmitter end determines the data rate and modulation and coding scheme for each transmitter antenna so that the calculated individual capacity of each transmitter antenna is not exceeded.

9. The method of claim 7 wherein the receiver end:
determines the data rate and modulation and coding scheme for each transmitter antenna so that the calculated capacity of each individual transmitter antenna is not exceeded, and
the information transmitted back to the transmitter end comprises the determined data rate and the modulation and coding scheme for each transmitter antenna.

10. Apparatus at a receiver end of a multiple input/multiple output wireless system in which a plurality of transmitter antennas at a transmitter end of a wireless system transmit a plurality of signals on separate channels to a plurality of receiver antennas at the receiver end of the system, the apparatus comprising:
means for determining instantaneous channel coefficients of the each of the separate channels between the transmitter antennas and receiver antennas;
means for determining an average signal-to-noise ratio of the signals received by the receiver antenna;
means for calculating, using the determined instantaneous channel coefficients and the determined average signal-to-noise ratio, the individual capacities of each of the transmitter antennas wherein the capacity of the k-th transmitter antenna, for k between 1 and t, is determined from the k-th term in $$\log_2\left(I + \frac{\rho}{t}h_1^+\left(I + \frac{\rho}{t}\sum_{i=2}^{t}h_ih_i^+\right)^{-1}h_1\right)+$$

$$\log_2\left(I + \frac{\rho}{t}h_2^+\left(I + \frac{\rho}{t}\sum_{i=3}^{t}h_ih_i^+\right)^{-1}h_2\right)+$$

-continued $$\log_2\left(I + \frac{\rho}{t}h_3^+\left(I + \frac{\rho}{t}\sum_{i=4}^{t} h_i h_i^+\right)^{-1} h_3\right) + \cdots + \log_2\left(1 + \frac{\rho}{t}h_t^+ h_t\right)$$

where t is the number of transmitter antennas, ρ is the average signal-to-noise ratio of the received signals, I is an identity matrix, $h_i$ is an i-th column for any i between 1 and t of a channel matrix containing the determined channel coefficients in which each coefficient $h_{ij}$ is the determined channel coefficient between the i-th transmitter antenna and the j-th receiver antenna, and $h_i^+$ is the Hermitian transpose of $h_i$; and means for transmitting information back to the transmitter end that uses the individual capacities of each of the transmitter antennas calculated by the calculating means so that when each transmitter antenna uses a determined data rate and modulation and coding scheme for each transmitter antenna, the calculated individual capacity of each transmitter antenna is not exceeded.

11. The apparatus of claim 10 wherein the information transmitted back to the transmitter end by the transmitting means comprises the calculated individual capacities of the transmitter antennas, whereby the transmitter end determines the data rate and modulation and coding scheme for each transmitter antenna so that the calculated individual capacity of each transmitter antenna is not exceeded.

12. The apparatus of claim 10 further comprising:
    means for determining the data rate and modulation and coding scheme for each transmitter antenna so that the calculated capacity of each individual transmitter antenna is not exceeded, and
    the information transmitted by the transmitting means back to the transmitter end comprises the determined data rate and modulation and coding scheme for each transmitter antenna.

13. The apparatus of claim 10 wherein the transmitter end is a base station and the receiver end is a wireless unit.

14. The apparatus of claim 10 wherein the transmitter end is a wireless unit and the receiver end is a wireless unit.

* * * * *